(12) United States Patent
Harriman et al.

(10) Patent No.: US 6,226,687 B1
(45) Date of Patent: *May 1, 2001

(54) METHOD AND APPARATUS FOR MAINTAINING AN ORDER OF DATA PACKETS

(75) Inventors: Edward S. Harriman, Bedford; Richard L. Angle, Wellesley; Geoffrey B. Ladwig, Chelmsford, all of MA (US)

(73) Assignee: Nortel Networks Limited, Montreal (CA)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/708,895

(22) Filed: Sep. 5, 1996

(51) Int. Cl.[7] .............................. G06F 15/16; H04L 12/56
(52) U.S. Cl. ............................................ 709/246; 370/394
(58) Field of Search .................................... 370/230, 394, 370/395; 395/200.75, 200.76, 200.77, 200.78, 200.79, 200.8; 709/245–250

(56) References Cited

U.S. PATENT DOCUMENTS

| | | | |
|---|---|---|---|
| 5,151,899 | * | 9/1992 | Thomas et al. ...................... 370/394 |
| 5,339,311 | * | 8/1994 | Turner ................................. 370/394 |
| 5,383,182 | * | 1/1995 | Therasse et al. .................... 370/394 |
| 5,414,705 | * | 5/1995 | Therasse et al. .................... 370/352 |
| 5,442,750 | * | 8/1995 | Harriman, Jr. et al. ............. 709/233 |
| 5,481,536 | * | 1/1996 | Reisch et al. ....................... 370/394 |
| 5,483,523 | * | 1/1996 | Nederlof ............................. 370/394 |
| 5,550,978 | * | 8/1996 | Takahashi et al. .................. 709/236 |
| 5,572,522 | * | 11/1996 | Calamvokis et al. ............... 370/390 |
| 5,590,122 | * | 12/1996 | Sandorfi et al. .................... 370/394 |
| 5,602,853 | * | 2/1997 | Ben-Michael et al. ............. 370/474 |
| 5,617,561 | * | 4/1997 | Blaauw et al. ...................... 395/500 |
| 5,712,854 | * | 1/1998 | Dieudonne et al. ................ 370/536 |
| 5,761,506 | * | 6/1998 | Angle et al. ........................ 709/102 |
| 5,774,739 | * | 6/1998 | Angle et al. .......................... 712/34 |
| 5,838,960 | * | 11/1998 | Harriman, Jr. ...................... 712/221 |
| 5,848,257 | * | 12/1998 | Angle et al. ........................ 712/219 |
| 5,935,235 | * | 8/1999 | Angle et al. .......................... 712/34 |

* cited by examiner

Primary Examiner—Zarni Maung
Assistant Examiner—Andrew Caldwell
(74) Attorney, Agent, or Firm—Blakely Sokoloff Taylor & Zafman LLP

(57) ABSTRACT

A method and apparatus for maintaining an order of processing data packets. One embodiment of the invention includes a first stage of data packet processing, which sequentially receives a plurality of independent data packets. The data packet are to be processed at the first stage in parallel. The plurality of independent data packets are then permitted to continue processing at a separate stage only in the order the independent data packets were received at the first stage of the data packet processing. In one embodiment, the invention includes assigning a sequence number to a first independent data packet of the plurality of packets prior to the first stage of data packet processing. Thereafter, the invention includes comparing the sequence number assigned to the first independent data packet to a servicing number. In response to the sequence number and the servicing number being different by N, wherein N is an integer, the invention permits the first independent packet to continue processing at a separate stage. Thereafter, the servicing number is incremented by replacing the servicing number with the sequence number.

43 Claims, 3 Drawing Sheets

METHOD AND APPARATUS FOR MAINTAINING AN ORDER OF DATA PACKETS

FIELD OF THE INVENTION

The present invention relates generally to the field of computer systems, and, in particular, to operations related to data packet switching operations in computer network systems.

BACKGROUND OF THE INVENTION

Information communicated along a network is commonly referred to as a data packet. A data packet is described as a well-defined block of bytes, typically consisting of a header, data, and trailer. The header of a data packet usually includes the source and destination addresses.

In the large scale networks, switching hubs are provided to "switch" data packets from one network segment to another network segment. These network segments may be separated by several intervening networks and, possibly, by many miles.

Typically, switching hubs receive data packets on a port coupled to a network segment, internally processes the data packet, and the transmit the data packets out a port coupled to a different network segment.

In some cases, more advanced switching hubs are able to increase the speed and efficiency of transferring data packets by performing packet switching techniques which involve relaying the packets through different switching hubs along the best routes presently available between the source and the destination. Determining the route upon which the packets are sent can be based upon such factors as the traffic of the available routes and which routes are presently operative.

Typically, the switching hubs operate at the network layer of the seven layer Open Systems Interconnection (OSI) Reference Model developed by the International Standardization Organization (ISO). Moreover, considering that switching hubs are independent of the data-link layer protocols, switching hubs can typically connect networks using different architecture (for example, Ethernet to Token Ring or Ethernet to FDDI).

However, as the bandwidth of network transmission mediums continuously increases, the speed and efficiency of the switching hubs should be increased to avoid slowing down the transmission of the data along the networks.

SUMMARY OF THE INVENTION

The present invention provides a method and apparatus for maintaining an order of processing data packets. One embodiment of the invention includes a first stage of data packet processing, which sequentially receives a plurality of independent data packets. The data packet are to be processed at the first stage in parallel. The plurality of independent data packets are then permitted to continue processing at a separate stage only in the order the independent data packets were received at the first stage of the data packet processing.

BRIEF DESCRIPTION OF THE DRAWINGS

The present invention is illustrated by way of example and not limitation in the figures of the accompanying drawings, in which like references indicate similar elements, and in which.

DETAILED DESCRIPTION

A method and apparatus are described for maintaining order of data packets when processing a set of independent data packets in parallel. In the following description, numerous specific details are set forth in order to provide a thorough understanding of the present invention. It will be apparent, however, to one of ordinary skill in the art that the present invention may be practiced without these specific details. In other instances, well-known standards, structures, and techniques have not been shown in order not to unnecessarily obscure the present invention.

Data packet processing applications typically consist of several separate stages (e.g. determining a protocol of a packet, filtering packets for a particular protocol, address resolution, transmit queuing, etc.). In the present invention, several independent packet can be processed by the same stage of an application in parallel. That is, several data packets can be processed by the same stage of a program at the same time, albeit at different instructions within a particular stage.

The packets are considered to be independent in the sense that the state of processing a particular packet is independent of the state of processing another packet. That is, the results of an instruction when processing a packet are not dependent on the results of processing any other packet.

When processing the data packets, the independent packets may begin a particular stage of a packet processing application in any order. However, for the overall data packet switching applications to operate efficiently, data packets should finish a stage in the order they were received by that same stage.

As a result, the present invention ensures that data packets will only leave a stage in the same order as they were received by that same stage. For example, if data packet A is the first packet to begin being processed at a first stage, and packet B is the second packet to begin being processed at the same stage, then packet B can not continue processing at a separate stage prior to packet A continuing to be processed at a separate stage.

To effect this, in the present invention, a unique number is assigned to each packet coming in a particular stage of a packet processing program. These numbers are assigned in the order the packets arrive. Ultimately, each packet may only leave the same stage in the order specified by the unique numbers.

Figure 1:
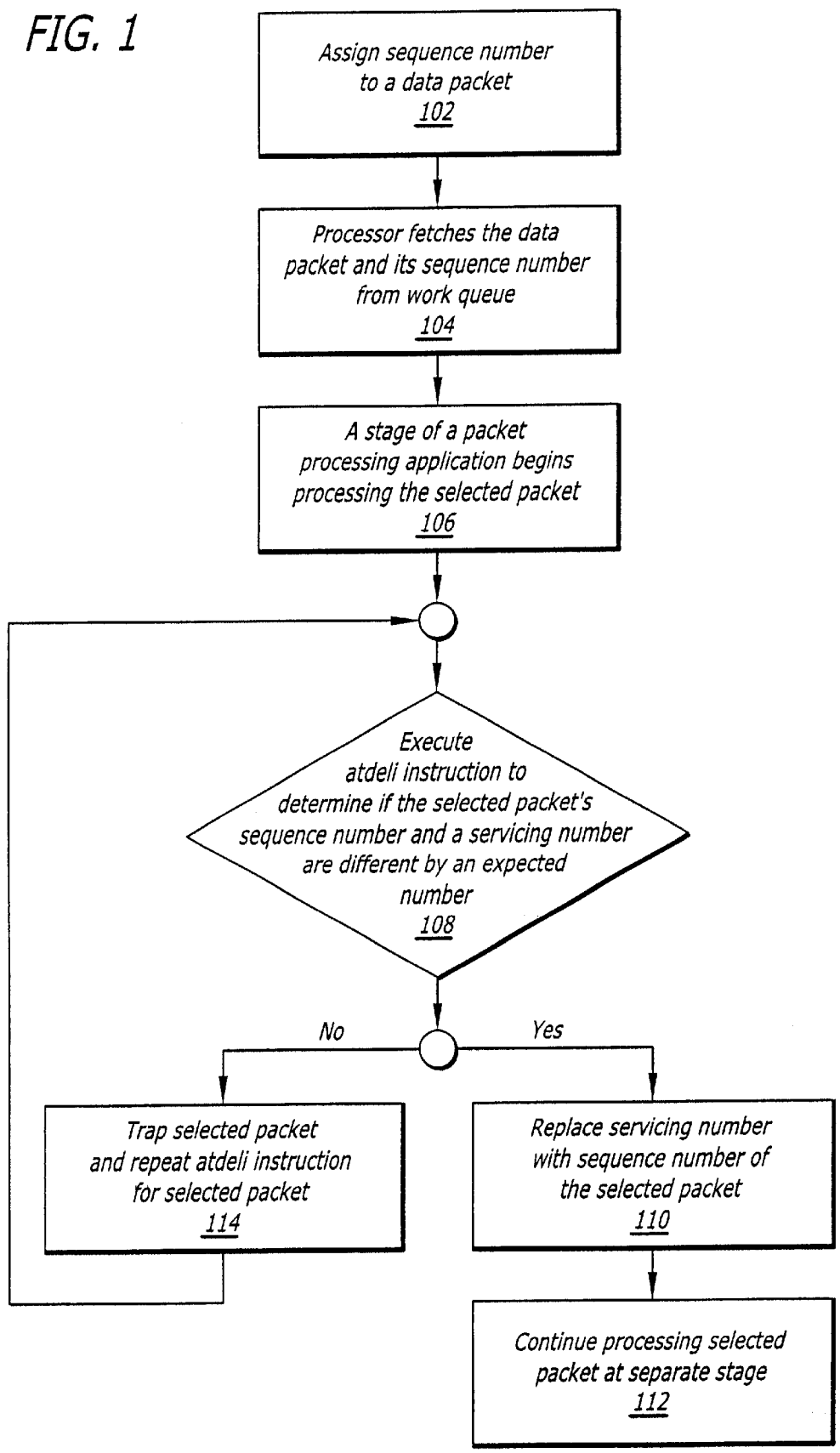
FIG. 1 is a flow diagram illustrating the steps of the present invention according to one embodiment.

FIG. 1 is a flow diagram describing the steps in one embodiment of the present invention. In step 102, a packet is received by a switching hub and is stored in a memory location. A pointer is assigned to the packet. The pointer is then stored in a work queue corresponding to an operation of a packet processing application that is to be performed on the data packet.

In step 104, a processor reads the work queue to determine which packet is next to be processed. When the processor reads from the work queue, the work queue provides the processor with a pointer pointing to a packet which needs to be worked upon and assigns that packet a sequence number, which the processor stores in a register. In alternative embodiments, the actual method of assigning a sequence number to a data packet can vary within the scope of the invention, and is in large part dependent upon the system board implementation of the switching hub implementing the present invention.

In step 106, a stage of a packet processing application begins processing the selected packet. Each stage of the application typically consist of several instructions. Moreover, as described above, several packets can independently be processed simultaneously by the same stage of an application, albeit at separate instructions within that stage.

In step 108, towards the end of the present stage processing the selected packet, an instruction, hereinafter referred to as the atdeli instruction, is executed to determine if selected packets can continue processing at a separate stage. In one embodiment, the atdeli instruction subtracts a servicing number from the sequence number assigned to the selected data packet to determine if the two numbers differ by one. The servicing number, which is typically stored in memory, controls which packets may exit the present stage of the application and continue at another stage. In alternative embodiments, the sequencing number may be subtracted from the servicing number, and the expected difference may be a number other than one, without departing from the scope of the invention.

If the sequence number and the servicing number are different by one, then in step 110, a separate instruction is executed to replace the present servicing number with the sequence number of the selected packet. For example, if the sequence number assigned to the selected packet is 1 and the present servicing number is 0, then the new servicing number is 1. Therefore, when the next packet is finished completing the same stage, that packet's sequence number, which should be one greater than the most recent packet, should be exactly one different from the new servicing number.

By expecting a difference between the sequence and the servicing number, less instructions are needed to implement the invention. More specifically, instead of using an instruction to increment the servicing number and a second instruction to store the incremented servicing number in memory, the servicing number can be incremented by replacing the present servicing number with the sequence number of the most recent data packet.

Using less instructions to keep the data packets in order is very important. Considering that a packet processing application typically consists of around 100 instructions (4–6 separate stages), adding just a few instructions to each stage to have packets finish the stages in the order they were received can add significant overhead to the application. For example, if only four instructions are added to each stage of a 100 instruction application, a 20% increase in overhead will be added to the application. As a result, it is important to limit the number of instructions added to each stage of a packet processing application.

In one embodiment, the atdeli instructions is an Atomic instruction that directly performs a read-compare operation on the servicing number which is stored in memory external to the processor. Consider the example atdeli instruction shown below in Table 1.

TABLE 1 atdeli d0, d1[0]

In the example of Table 1, the data stored in the register d0 is subtracted from the data stored in the memory pointed to by the register d1[0]. For example, the address of the data in memory may be formed by adding 0 to the byte address in d1[31:0]. In one embodiment d0 and d1 are part of a register file dedicated to the processor performing the present stage. In alternative embodiments, without departing from the scope of the invention, the atdeli instruction could be performed as a typical arithmetic instruction comparing two values located in a memory device.

After the sequence number assigned to the most recent packet has replaced the present servicing number, in step 112 the selected packet is allowed to continue processing at a subsequent separate stage of a packet processing application.

However, if it has been determined in step 108, that the difference between the sequence number and the servicing number is not equal to the expected number, then in step 114 the atdeli instruction performs a trapping operation to prevent the present packet from leaving the present stage until its sequence number and the servicing number are different by the expected number.

In one embodiment, the trapping operation is performed by the atdeli instruction, as opposed to having the atdeli instruction set a condition in response to the compare operation returning a value other than the expected value, and then perform a second instruction to check the condition and repeat of the atdeli instruction if the condition is set.

As a result of using one instruction to perform the compare and trapping operation, less overhead is added to each stage of a data packet processing application.

In one embodiment, when the atdeli instruction causes a trap, the memory address of the instruction following the failing atdeli instruction and a trap indication are recorded. The next time an instruction is to be fetched for the trapped packet, the fetch logic detects the trap indication and forces the program counter (PC) to point to the atdeli trap handler.

The trap handler in turn recovers the address of the instruction following the atdeli, subtracts one from it and jumps to that location, effectively causing re-execution of the failed atdeli instruction.

Once the compare operation of the atdeli instruction is successful, in step 110 the servicing number is replaced with the sequence number of the present data packet as described above. Thereafter, in step 112, the present packet is permitted to continue processing at a separate stage of a packet processing application.

Multitasking Multiprocessor

One embodiment of the invention is implemented on a multitasking computer system architecture supporting multiple independent, specialized, loosely coupled processors. The architecture provides a novel approach to scheduling processes for execution on one of the multiple processors, migrating processes between the processors, rescheduling of processes upon a cache miss, distributing memory along pipeline stages in the processors, wherein each process may represent the present state of a data packet being processed by a data packed processing application. The architecture is particularly optimized for operations related to as may be performed by an International Standards Organization (ISO) Open Systems Interconnection (OSI) layer two (i.e., media access control sublayer MAC) based network switching device, i.e., a switching hub, in a data communications network.

Figure 2:
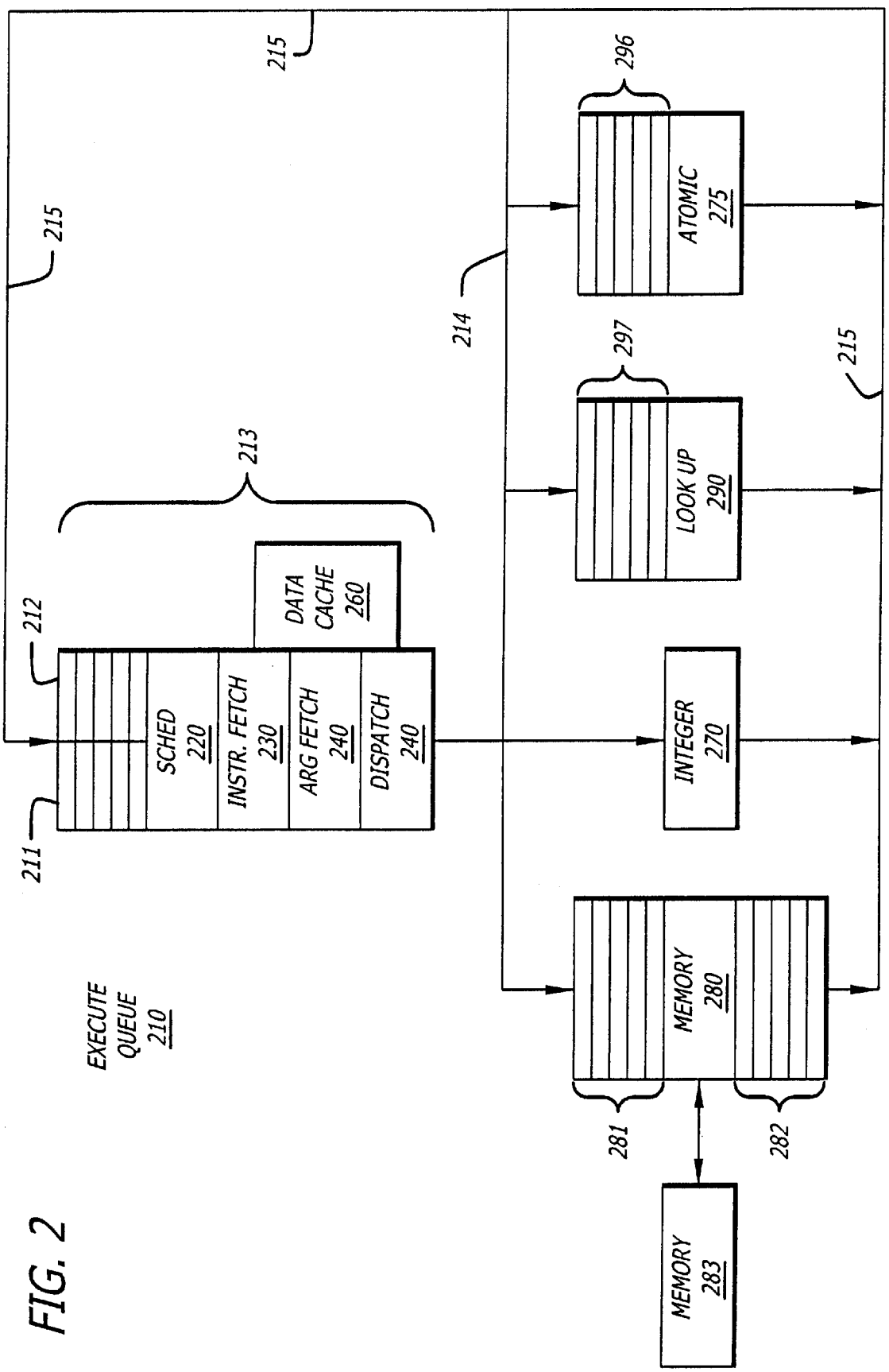
FIG. 2 illustrates a multitasking multiprocessor capable of implementing the present invention according to one embodiment.

Referring to FIG. 2, the multitasking multiprocessor which is capable of implementing one embodiment of the present invention is shown. In particular, the processor comprises a plurality of specialized processors, e.g., processors 270, 280, 290 and 295, which multitask between a plurality of concurrently executing processes. Each processor performs a specific and relatively narrow set of operations such as arithmetic operations or memory access operations.

The state of each process is specified by a set of registers, referred to as the process' context. In one embodiment, each process context has between 16 and 32 general registers, 4 pointer (address) registers, a program counter (PC), and a condition flag. Importantly, as each process executes independently of all other processes, the state of each process is independent of the state of all other processes.

Figure 3:
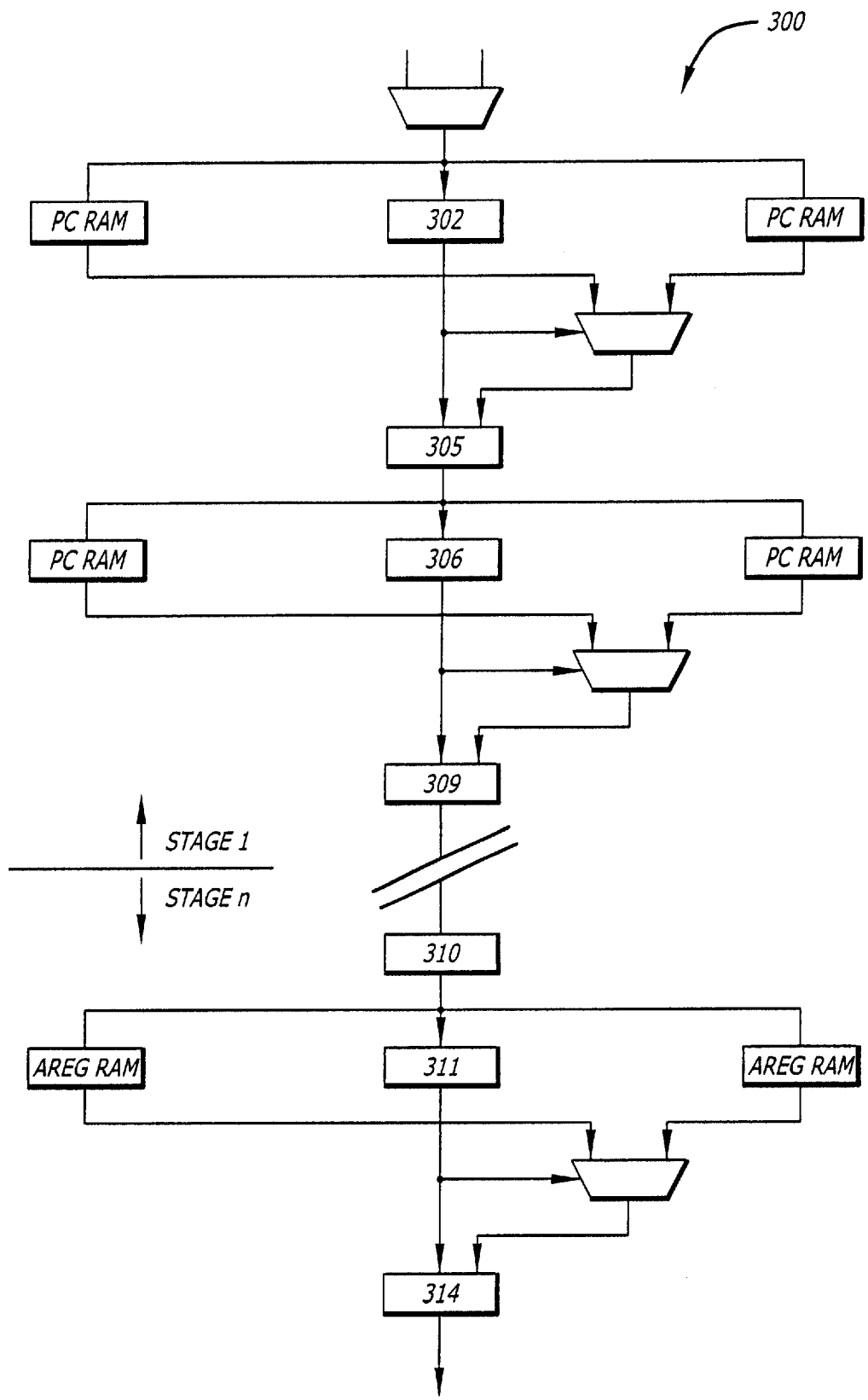
FIG. 3 illustrates an execution pipeline of a processor included in a multitasking multiprocessor according to one embodiment of the present invention.

With reference to FIG. 3, the processors typically include an execution pipelines made up of a plurality of stages. FIG. 3 illustrates an execution pipeline 300, or simply, pipeline 300, for a processor. The pipeline comprises, for example, a series of registers 302, 305, 306, 309, 310, 311, 314, etc., coupled in communication. In one embodiment of the present invention, the registers are D flip-flops.

A series of one or more registers within the pipeline represent a stage. For example, registers 302, 305, 306 and 309 comprise stage 1, while registers 310, 311 and 314 comprise stage n.

Each stage of the pipeline for a given processor is executing a different, independent process. This configuration allows each processor a set of processes to execute. Of course, the set processes operated on by a processor changes dynamically. Moreover, more processes than pipeline stages exist at any given time, as described below, which allows processes to migrate between processors and allows the processes queued at any one processor to increase momentarily without causing other processors to sit idle. For example, when many processes are queued at input queue 281 for execution by the memory processor 280, other processes continue to be executed by the other processors 270, 290, and 295.

It is important to note that although one embodiment of the present invention provides for four processors executing concurrently as shown in FIG. 2, it will be understood that the architecture embodied by the present invention is scalable. In other words, any number of conceivable processors may be coupled as illustrated in FIG. 2.

The multitasking system embodied by the present invention further includes a scheduler 220. The scheduler 220 maintains a list of processes that are ready to be executed. This list is maintained in a first in first out (FIFO) order in an execute queue 210. Every clock cycle, the scheduler dequeues a process from the execute queue 210 and passes the process identification (PID) to an instruction fetch unit 230. The instruction fetch unit 230 receives the PID and uses it to read the program counter (PC) for the associated process. The fetch unit then reads a single instruction from a program store and transfers the instruction to an argument fetch unit 240. The argument fetch unit 240 decodes the instruction and reads the arguments specified in the instruction. The arguments may refer to general registers associated with the process or memory locations. The argument fetch unit communicates with the data cache 260 to determine which memory locations are immediately available via cache. The argument fetch unit 240 then transfers the arguments fetched and the associated instruction to the dispatcher 250.

The dispatch unit examines the instruction and the state of cache 260 to determine to which processor the instruction should be transferred for execution. If cache 260 indicates that an argument is needed from memory 283 but the argument is not present in cache, the instruction fails, i.e., the instruction is not executed by a processor. Rather, the instruction is forwarded to a memory processor 280. The memory processor 280 reads the appropriate cache line containing the needed argument from memory 283. Upon completion of performing the read of the cache line, memory processor 280 requeues the process so that the instruction can be processed again by the scheduler 220, instruction fetch unit 230, argument fetch unit 240 and dispatcher 250, collectively referred to hereafter as prefetch unit 213. If after processing the instruction a second time, the prefetch unit 213 determines all the arguments are present in data cache 260, the instruction is sent to the appropriate processor for execution via internal bus 214.

If the instruction specifies the operation to be executed is an arithmetic operation such as add, the process identification (PID), the instruction, and the arguments associated with the instruction are transferred to the integer processor 270. If the operation to be executed is a memory access operation, e.g., a load or store, then the instruction is forwarded to the memory processor 280. Likewise, if the operation is an atomic operation, then the instruction is delivered to the atomic processor 295. In one embodiment of the present invention, the atdeli instruction is executed by the atomic processor 295.

Upon an instruction be dispatched to an appropriate processor, that processor is responsible for completing the operation indicated by the instruction, updating the state (i.e., the registers) of the process, and requeuing the process back to the execute queue 210 maintained by the scheduler 220.

As discussed above, the present invention is envisioned as operating in a switching hub in a data communications network. In that environment, latency is not a key issue; rather, data packet throughput is of primary importance. Due to the fact that there are many processes available for execution, combined with the fact that latency is not of primary consideration, it is not as important that any one instruction in a process be executed quickly. As a result, the present invention may utilize a greater number of pipeline stages. For example, the scheduler, instruction fetch, argument fetch, dispatcher, integer processor path has eighteen pipeline stages.

In general, although embodiment supports a long execution pipeline for each processor, each stage in the pipeline is operating on behalf of a unique and independent process. Thus, there is no need for bypassing whereby results from a stage in the pipeline are fed back to a preceding stage in the pipeline. Likewise, feedforward, where a stage in the pipeline is fed an argument before the associated instruction is received by the stage in the pipeline, is not necessary. This greatly simplifies the logic at each pipeline stage.

Processes vs. Pipeline Stages

One embodiment of the present invention supports more processes than pipeline stages, as provided and limited by the depth of the execute queue 210. By supporting more processes than the cumulative sum of pipeline stages in each of the processors, the processors continually have processes waiting in their input queue to be executed. By overloading the processors with processes at any given instant, the processors generally always have processes queued for execution and never sit idle, thus improving system performance. The greater the depth of the execute queue, the greater the number of processes supported by the architecture, and the greater number of processes queued by each of the individual processors for execution. This ensures that each stage in a pipeline of a processor is executing at all times.

For example, the lookup processor 290 executes the lookup instruction. The execution of the lookup instruction generally requires a number of cycles through the execution pipeline of the lookup processor to complete execution of the instruction. Thus, when the dispatcher 250 hands a process to the lookup processor, the lookup processor is busy for a period of time thereafter, executing the lookup instruction. By providing an input queue 297 to the lookup processor, dispatcher can dispatch a process to the lookup processor for execution of the lookup instruction. The process remains in the lookup processor's input queue 297 until the first stage in the execution pipeline accepts the process from the input queue.

Migration of Processes Between Processors

Closely related to the ability to support at least as many processes as there are the sum of pipeline stages in the processors, is the ability to migrate processes between processors. With reference to FIG. 2, a feedback path is provided by bus 215. When a processor completes execution of an instruction, the program counter for the process is incremented to point to the next instruction of the process. The process is then requeued by scheduler 220 in execute queue 210. Prefetch unit 213 fetches the next instruction and associated arguments, if any, and dispatches the process to the same or other processor for execution of the next instruction (or same instruction, in the case of a cache miss) in the process. Thus, a process can migrate from one processor to another processor.

The present invention may be implemented on a storage medium having stored thereon instructions which can be used to program a computer to perform the present invention. The storage medium can include, but is not limited to, any type of disk including floppy disks, optical disks, CD-ROMs, and magneto-optical disks, ROMs, RAMs, EPROMs, EEPROMs, magnet or optical cards, or any type of media suitable for storing electronic instructions. Alternatively, the present invention could be implemented in discrete hardware components such as large-scale integrated circuits (LSI's), application-specific integrated circuits (ASIC's) or in firmware.

In alternative embodiments, the present invention may be applicable to implementations of the invention on integrated circuits, or chip sets, wireless implementations, switching systems products and transmission systems products. For purposes of this application, the terms switching systems products shall be taken to mean private branch exchange (PBXs), central office switching systems that interconnect subscribers, toll/tandem switching systems for interconnecting trunks between switching centers, and broadband core switches found at the center of a service provider's network that may be fed by broadband edge switches or access muxes, and associated signaling, and support systems and services.

The term transmission systems products shall be taken to mean products used by service providers to provide interconnection between their subscribers and their networks such as loop systems, and which provide multiplexing, aggregation and transport between a service provider's switching systems across the wide area, and associated signaling and support systems and services.

In the foregoing specification the invention has been described with reference to specific exemplary embodiments thereof. It will, however, be evident that various modifications and changes may be made thereto without departing from the broader spirit and scope of the invention. The specification and drawings are, accordingly, to be regarded in an illustrative rather than restrictive sense.

What is claimed is:

1. A method for maintaining an order of data packets comprising the steps of:

at a first stage of a data packet processing application, within a computer system, receiving a plurality of independent data packets in a first order, wherein at least some of said data packets are to be processed in parallel and at least a first one of said independent data packets is associated with a sequence number;

comparing said sequence number associated with said first independent data packet to a servicing number; and in response to said sequence number and said servicing number being different by N, where N is an integer being greater than one, permitting said first independent data packet to continue processing within said computer system such that said plurality of independent data packets are maintained in said first order at a separate stage of said application.

2. The method of claim 1, further including the step of:

in response to said sequence number and said servicing number being equal or different by a number other than N, trapping said first independent packet in said first stage of data packet processing and repeating said step of comparing the sequence number and the servicing number.

3. The method of claim 1, wherein the method is performed on a multitasking computer system architecture supporting multiple independent processors dedicated to processing data packets.

4. The method of claim 3, wherein the method is implemented in a switching system product.

5. The method of claim 3, wherein the method is implemented in a transmissions system product.

6. A method for maintaining an order of data packets comprising:

at a first stage of a data packet processing application, within a computer system, receiving a plurality of independent data packets in a first order, wherein at least some of said data packets are to be processed in parallel and at least a first one of said independent data packets is associated with a sequence number;

comparing said sequence number associated with said first independent data packet to a servicing number;

in response to said sequence number and said servicing number being different by N, where N is an integer, permitting said first independent data packet to continue processing within said computer system such that said plurality of independent data packets are maintained in said first order at a separate stage of said application; and incrementing said servicing number by replacing said servicing number with said sequence number prior to permitting said first independent data packet to continue processing at said separate stage of said data packet processing application.

7. The method of claim 6, further comprising:

trapping said first independent data packet in said first stage of data packet processing and subsequently comparing said sequence number and said servicing number.

8. The method of claim 7, wherein said comparing of said sequence number and said servicing number, and trapping said first independent packet are performed in response to executing one instruction.

9. The method of claim 8, wherein said one instruction that performs the step of comparing said sequence number and said servicing number, and the step of trapping said first independent packet, is an atomic instruction that performs a direct read and compare operation on data stored in a memory.

10. A method for maintaining an order of data packets comprising:

at a first stage of a data packet processing application, within a computer system, receiving a plurality of independent data packets in a first order, wherein at least some of said data packets are to be processed in parallel and at least a first one of said independent data packets is associated with a sequence number;

comparing said sequence number associated with said first independent data packet to a servicing number;

in response to said sequence number and said servicing number being different by N, where N is an integer, permitting said first independent data packet to continue processing within said computer system such that said plurality of independent data packets are maintained in said first order at a separate stage of said application; and in response to said sequence number and said servicing number being equal or different by a number other than N, trapping said first independent packet in said first stage of data packet processing and repeating said step of comparing the sequence number and the servicing number;

wherein the comparing of said sequence number and said servicing number, and the trapping of said first independent packet are performed in response to executing one instruction.

11. The method of claim 10, wherein said one instruction, which performs the step of comparing and the step of trapping, is an atomic instruction that performs a direct read and compare operation on data stored in a memory.

12. A computer-readable medium having stored thereon a plurality of instructions including at least one instruction for maintaining an order of a plurality of data packets, said at least one instruction, when executed by a processor, being operative to cause said processor to perform the steps of:

assigning a sequence number to a first independent data packet of said plurality of packets;

at a first stage of a data packet processing application, within a computer system, receiving said plurality of independent data packets in a first order, wherein at least some of said data packets are to be processed in parallel;

comparing said sequence number assigned to said first independent data packet to a servicing number; and in response to said sequence number and said servicing number being different by N, wherein N is an integer being greater than one, permitting said first independent packet to continue processing at a separate stage of said data packet processing application.

13. The computer-readable medium of claim 12, wherein said at least one instruction is operative when executed by said processor to cause said processor to further perform the step of:

in response to said sequence number and said servicing number being equal or different by a number other than N, trapping said first independent packet in said first stage of data packet processing and repeating said step of comparing the sequence number and the servicing number.

14. The computer-readable medium of claim 12 implemented in a switching system product.

15. The computer-readable medium of claim 12 implemented in a transmissions system product.

16. A computer-readable medium having stored thereon a plurality of instructions including at least one instruction for maintaining an order of a plurality of data packets, said at least one instruction, when executed by a processor, being operative to cause said processor to perform the steps of:

assigning a sequence number to a first independent data packet of said plurality of packets;

at a first stage of a data packet processing application, within a computer system, receiving said plurality of independent data packets in a first order, wherein at least some of said data packets are to be processed in parallel;

comparing said sequence number assigned to said first independent data packet to a servicing number; and in response to said sequence number and said servicing number being different by N, wherein N is an integer, permitting said first independent packet to continue processing at a separate stage of said data packet processing application, and incrementing said servicing number by replacing said servicing number with said sequence number prior to permitting said first independent packet to continue processing at said separate stage.

17. The computer-readable medium of claim 16, implemented on a multitasking computer system architecture supporting multiple independent processors dedicated to processing data packets.

18. The computer-readable medium of claim 16, wherein said at least one instruction is operative when executed by said processor to cause said processor to perform the step of:

trapping said first independent data packet in said first stage of data packet processing and subsequently comparing the sequence number and the servicing number if said sequence number and said servicing number are equal or different by a number other than N.

19. The computer-readable medium of claim 18, wherein the step of comparing said sequence number and said servicing number and the step of trapping said first independent packet are performed in response to executing one instruction.

20. The computer-readable medium of claim 19, wherein said one instruction, which performs the step of comparing and the step of trapping, is an atomic instruction the performs a direct read and compare operation on data stored in a memory.

21. A computer-readable medium having stored thereon a plurality of instructions including at least one instruction for maintaining an order of a plurality of data packets, said at least one instruction, when executed by a processor, being operative to cause said processor to perform the steps of:

assigning a sequence number to a first independent data packet of said plurality of packets;

at a first stage of a data packet processing application, within a computer system, receiving said plurality of independent data packets in a first order, wherein at least some of said data packets are to be processed in parallel;

comparing said sequence number assigned to said first independent data packet to a servicing number;

in response to said sequence number and said servicing number being different by N, wherein N is an integer, permitting said first independent packet to continue processing at a separate stage of said data packet processing application;

in response to said sequence number and said servicing number being equal or different by a number other than N, trapping said first independent packet in said first stage of data packet processing and repeating said step of comparing the sequence number and the servicing number;

wherein the step of comparing said sequence number and said servicing number, and the step of trapping said first independent packet are performed in response to executing one instruction.

22. The computer-readable medium of claim 21, wherein said one instruction, which performs the step of comparing and the step of trapping, is an atomic instruction the performs a direct read and compare operation on data stored in a memory.

23. A computer system configured to maintain an order of data packets comprising:

a first stage of a data packet processing application device, within a first single computer system, configured to receive a plurality of independent data packets in a first order, wherein at least some of said data packets are to be processed in parallel and at least a first independent data packet of said plurality of independent data packets is associated with a sequence number;

a device configured to compare the sequence number associated with the first independent data packet to a servicing number; and a device configured to permit said first independent packet to continue processing at a separate stage of said data packet processing device, in response to said sequence number and said servicing number being different by N, where N is an integer being greater than one.

24. The computer system of claim 23, further comprising:

a device configured to trap said first independent packet in said first stage data packet processing device and re-compare the sequence number and the servicing number in response to said sequence number and said servicing number being equal or different by a number other than N.

25. The computer system of claim 23 further comprising multiple independent processors dedicated to processing said plurality of independent data packets.

26. The computer system of claim 23 comprising a switching system product.

27. The computer system of claim 23 comprising a transmissions system product.

28. A computer system configured to maintain an order of data packets comprising:

a first stage of a data packet processing application device, within a first single computer system, configured to receive a plurality of independent data packets in a first order, wherein at least some of said data packets are to be processed in parallel and at least a first independent data packet of said plurality of independent data packets is associated with a sequence number;

a device configured to compare the sequence number associated with the first independent data packet to a servicing number;

a device configured to permit said first independent packet to continue processing at a separate stage of said data packet processing device, in response to said sequence number and said servicing number being different by N, where N is an integer; and a device configured to increment said servicing number by replacing said servicing number with said sequence number, in response to said sequence number and said servicing number being different by N.

29. The computer system of claim 28, further comprising:

a device configured to trap said first independent packet in said first stage of the data packet processing device and re-compare the sequence number and the servicing number in response to said sequence number and said servicing number being equal or different by a number other than N.

30. The computer system of claim 29, wherein said devices are configured to compare said sequence number and said servicing number and to trap said first independent data packet, in response to executing one instruction.

31. The computer system of claim 30, wherein said one instruction is an atomic instruction that performs a direct read and compare operation on data stored in a memory.

32. A computer system configured to maintain an order of data packets comprising:

a first stage of a data packet processing application device, within a first single computer system, configured to receive a plurality of independent data packets in a first order, wherein at least some of said data packets are to be processed in parallel and at least a first independent data packet of said plurality of independent data packets is associated with a sequence number;

a device configured to compare the sequence number associated with the first independent data packet to a servicing number; and a device configured to permit said first independent packet to continue processing at a separate stage of said data packet processing device, in response to said sequence number and said servicing number being different by N, where N is an integer;

a device configured to trap said first independent packet in said first stage of the data packet processing device and re-compare the sequence number and the servicing number in response to said sequence number and said servicing number being equal or different by a number other than N;

wherein said devices are configured to compare said sequence number and said servicing number, and trap said first independent packet, in response to executing one instruction.

33. The computer system of claim 32, wherein said one instruction is an atomic instruction that performs a direct read and compare operation on data stored in a memory.

34. A computer system configured to maintain an order of data packets comprising:

means for receiving a plurality of independent data packets in a first order at a first stage of a data packet processing application in a first single computer system, said data packet are to be processed in parallel;

means for assigning a sequence number to a first independent data packet of said plurality of packets prior to the first stage of data packet processing said first independent data packet; and means for comparing the sequence number assigned to the first independent data packet to a servicing number, and in response to said sequence number and said servicing number being different by N, where N is an integer, permitting said first independent packet to continue processing at a separate stage.

35. The computer system of claim 34, further comprising:

means for, in response to said sequence number and said servicing number being equal or different by a number other than N, trapping said first independent packet in said first stage of data packet processing and repeating said step of comparing the sequence number and the servicing number.

36. The computer system of claim 34, further comprising:

means for incrementing said servicing number by replacing said servicing number with said sequence number, in response to said sequence number and said servicing number being different by N.

37. The computer system of claim 36, consisting of a multitasking computer system architecture supporting multiple independent processors dedicated to processing data packets.

38. The computer system of claim 36, wherein the computer system comprises a switching system product.

39. The computer system of claim 36, wherein the computer system comprises a transmissions system product.

40. A method for maintaining an order of data packets comprising the steps of:

at a first stage of a data packet processing application, receiving a plurality of independent data packets in a first order, wherein at least some of said data packets are to be processed in parallel and at least a first one of said independent data packets is associated with a sequence number;

comparing said sequence number associated with said first independent data packet to a servicing number; and in response to said sequence number and said servicing number being different by N, where N is an integer, incrementing said servicing number by replacing said servicing number with said sequence number prior to permitting said first independent data packet to continue processing at a separate stage of said data packet processing application.

41. The method of claim 40 further comprising:

permitting said first independent data packet to continue processing such that said plurality of independent data packets are maintained in said first order at said separate stage of said data product processing application.

42. A computer-readable medium having stored thereon a plurality of instructions including at least one instruction for maintaining an order of a plurality of data packets, said at least one instruction, when executed by a processor, being operative to cause said processor to perform the steps of:

assigning a sequence number to a first independent data packet of said plurality of packets;

at a first stage of a data packet processing application, receiving said plurality of independent data packets in a first order, wherein at least some of said data packets are to be processed in parallel;

comparing the sequence number assigned to the first independent data packet to a servicing number; and in response to said sequence number and said servicing number being different by N, where N is an integer, incrementing said servicing number by replacing said servicing number with said sequence number prior to permitting said first independent packet to continue processing at a separate stage of said data packet processing application.

43. The computer-readable medium of claim 42 further comprising:

in response to said sequence number and said servicing number being different by N, permitting said fist independent packet to continue processing at said separate stage.

* * * * *

UNITED STATES PATENT AND TRADEMARK OFFICE
CERTIFICATE OF CORRECTION

PATENT NO.   : 6,226,687 B1
DATED        : May 1, 2001
INVENTOR(S)  : Harriman et al.

It is certified that error appears in the above-identified patent and that said Letters Patent is hereby corrected as shown below:

Brief Description of Drawings,
First paragraph, delete "in which." and insert -- in which: --.

Claim 22,
Delete "instruction the performs" and insert -- instruction that performs --.

Claim 43,
Delete "permitting said fist" and insert -- permitting said first --.

Signed and Sealed this

Thirtieth Day of October, 2001

Attest:

NICHOLAS P. GODICI
Attesting Officer    Acting Director of the United States Patent and Trademark Office